United States Patent
Wong et al.

(10) Patent No.: US 7,270,302 B1
(45) Date of Patent: Sep. 18, 2007

(54) SCALABLE THERMAL CONTROL SYSTEM FOR SPACECRAFT MOUNTED INSTRUMENTATION

(75) Inventors: Hamilton Wong, Skillman, NJ (US); Neil Goodzeit, Princeton, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 10/829,358

(22) Filed: Apr. 22, 2004

Related U.S. Application Data

(60) Provisional application No. 60/465,012, filed on Apr. 22, 2003.

(51) Int. Cl.
*B64G 1/58* (2006.01)
(52) U.S. Cl. ................................. 244/171.8
(58) Field of Classification Search ............ 244/158 A, 244/163, 158 R, 117 A; 165/104.22, 41, 165/104.34, 104.33, 904
See application file for complete search history.

(56) References Cited

U.S. PATENT DOCUMENTS

| | | | | |
|---|---|---|---|---|
| 3,489,203 A | * | 1/1970 | Fischell | 165/274 |
| 3,540,688 A | * | 11/1970 | Schulte | 248/567 |
| 4,880,050 A | * | 11/1989 | Nakamura et al. | 165/41 |
| 5,117,901 A | * | 6/1992 | Cullimore | 165/86 |
| 5,606,870 A | * | 3/1997 | Lester | 62/434 |
| 5,823,476 A | * | 10/1998 | Caplin | 244/158 R |
| 5,823,477 A | * | 10/1998 | York | 244/163 |
| 6,017,013 A | * | 1/2000 | Simonian | 248/632 |
| 6,027,077 A | * | 2/2000 | Eller et al. | 244/173 |
| 6,073,888 A | * | 6/2000 | Gelon et al. | 244/163 |
| 6,164,077 A | * | 12/2000 | Feger | 62/6 |

* cited by examiner

*Primary Examiner*—Tien Dinh
(74) *Attorney, Agent, or Firm*—McDermott Will & Emery LLP

(57) ABSTRACT

A spacecraft instrument thermal control method and system providing scalable thermal control of on-board instrument temperature. Adapted for a spacecraft with bus supporting instrumentation and thermal radiator panels, cooling is carried out by one or more active coolers, such as cryocoolers, each mounted to the spacecraft at a radiator spatially separated from the instrument, with cold side of the cooler being thermally coupled to an instrument focal plane or other instrument location requiring cryogenic cooling and the warm side coupled to the radiator. A closed loop temperature control system measures the temperature of the controlled portion of the instrument, and adjusts active cooler drive signals to maintain a specified set point temperature.

21 Claims, 4 Drawing Sheets

SCALABLE THERMAL CONTROL SYSTEM FOR SPACECRAFT MOUNTED INSTRUMENTATION

CROSS-REFERENCES TO RELATED APPLICATIONS

This application claims priority from U.S. Provisional Application No. 60/465,012, filed on Apr. 22, 2003, the entire contents of which are incorporated herein by reference.

TECHNICAL FIELD

This invention relates generally to spacecraft instrumentation cooling, and more particularly to a novel method and system of doing so implementing active cooling elements.

BACKGROUND OF THE INVENTION

Historically, satellite architecture has featured a small number of relatively large spacecraft carrying all instrumentation required to carry out prescribed missions. There is a current trend in some applications, however, toward deployment of a multiple satellite, or "multi-sat" approach, such as envisioned in NASA's GOES-R system architecture featuring smaller spacecraft each incorporating different subsets of instrumentation. The "multi-sat" architecture is advantageous because of its increased implementation and operational flexibility since instruments may be launched as they become available; there is no need to delay launches and system implementation until all instruments are available. Greater flexibility also exists by this architecture with regard to in-orbit sparing, because orbital locations of primary instruments can adjusted independently to minimize the coverage impacts of spacecraft or instrument failures. Furthermore, multi-sat architecture lends itself to a spiral upgrade approach using a common scalable bus design with substantial growth margin. The design scalability eliminates the need for expensive spacecraft redesigns or block changes as system requirements change and new instruments are introduced.

A drawback of multi-sat architecture is that it requires at least twice as many spacecraft to implement, compared to current "large-sat" architecture. If the spacecraft are so heavy that they require dedicated launches, then the increased launch cost might render the multi-sat architecture too expensive to implement. Therefore, to provide a cost-effective system solution, the spacecraft must be dual-launch compatible.

To enable a dual launch with payload mass margin drives spacecraft designers to consider a standard dual-wing solar array configuration. Such a configuration, which is typical for GEO communications spacecraft, has one solar array that extends from the north-facing panel and another that extends from the south-facing panel. This "balanced" configuration tends to result in small solar pressure disturbance torque and minimal propellant and operational down time needed for momentum control thruster maneuvers. With less propellant needed for momentum adjust, greater payload mass is accommodated while maintaining the desired dual launch compatibility.

An additional benefit of a dual-wing configuration is in reduced reaction wheel (RWA) operating speeds and jitter, and reduced solar array thermal snap attitude disturbance at eclipse exit. A disadvantage, however, is that one of the solar arrays will impede the field of-view (FOV) of the instrument passive cryogenic radiators, which prevents achieving the required temperature control of critical focal plane sensor elements. If instrument focal plane temperatures cannot be maintained, then mission performance will be impacted. Therefore, despite the advantage of a dual-array configuration, current spacecraft tend to feature a single solar array wing. The single wing design is used because it leaves one side of the spacecraft (either the north or south side) with an unobstructed view of cold space. The instruments are then mounted on the spacecraft's earth facing panel such that their thermal radiators take advantage of this unobstructed view, and hence their focal planes may be maintained at the proper temperatures. The single wing configuration tends to lead to a large solar pressure torque, large momentum-adjust propellant requirements, frequent (e.g., daily) momentum adjust maneuvers that disrupt instrument operations, and higher RWA speeds that produce larger disturbances and jitter. And the single wing design considerably limits dual launch payload mass capability because of the need to carry a large amount of momentum adjust propellant.

Another disadvantage of current GOES architecture is that each instrument must include its own thermal radiators and active coolers as necessary to maintain the proper focal plane temperatures. For passively cooled instruments with cryogenic thermal requirements the required radiator size may be large (e.g., more than 10 ft$^2$) and the need to accommodate such radiators may drive the instruments to be larger and heavier than they would nominally have to be. Also, a GEO spacecraft design includes its own radiators (e.g. the north and south-facing panels), and these radiators are generally underutilized for a GEO remote sensing mission due to overall low thermal dissipation requirements. The fact that the instruments do not have access to these radiators, and hence must supply their own duplicate radiators, is highly mass inefficient.

Instrument radiators are located on only one side of the instrument, which either faces south or north. To prevent instrument radiator sun exposure, GEO remote sensing spacecraft must execute a 180-degree yaw flip every 6 months. During the yaw flip and the subsequent settling transient, the instrument data is unavailable.

Additionally, the present approach to instrument thermal control lacks scalability. If additional instrument heat must be rejected, then the instruments must grow in size and mass to accommodate the larger radiators or active coolers. Also, the temperature of the focal planes of passively cooled instruments may fluctuate due to daily and seasonal changes in the instrument thermal environment. Such temperature variations may possibly degrade measurement accuracy.

Finally, next generation primary instruments (i,e., imagers and sounders) have extremely stringent pointing and jitter requirements. Active coolers incorporated in the instruments may produce mechanical vibrations that can impact the measurement accuracy. Mitigation of these vibration effects may complicate instrument designs and increase cost.

SUMMARY OF THE DISCLOSURE

The disclosure solves the above-stated problems of prior-art GEO remote sensing spacecraft by providing a scaleable instrument thermal control arrangement incorporated into the spacecraft design. An exemplary spacecraft in which the thermal control arrangement may be implemented is characterized in part by a spacecraft bus supporting an instrument accommodation platform on which is mounted at least one instrument tending to generate heat, and spacecraft thermal radiator panels spatially separated from at least one instrument. The arrangement comprises at least one active cooler, such as a cryocooler, mounted to the spacecraft at a location spatially separated from the instrument and platform, in which the active cooler is thermally linked to one of the spacecraft thermal radiator panels for removal of active cooler waste heat: This physical separation of the coolers from the instruments reduces the impact of cooler-induced mechanical vibrations.

In a specific exemplary embodiment, the arrangement includes a bank of active coolers located on the spacecraft bus, sized to provide required thermal capability, redundancy, and reliability. The cold side of the active cooler bank is thermally connected to the instrument focal planes or other assemblies requiring cryogenic cooling, and the warm side is connected to the spacecraft radiator panels for waste heat removal. The spacecraft radiator panels may be the standard GEO spacecraft north/south-facing radiators, or may be additional radiators attached to the east and west spacecraft panels. The cooler resources may be allocated and/or actively controlled during a mission by on-board flight software to maintain the required instrument focal plane temperatures. A closed-loop control system suppresses focal plane temperature variations due to changes in the instrument thermal environment.

The active coolers may be connected to both the north and south spacecraft radiators, without regard for seasonal solar insulation, thereby allowing the 6 month yaw flips to be eliminated. Also, the system provides scalability, by allowing the number, capability, and type of the active coolers to be modified without impacting instrument designs. And because a standard dual-wing GEO spacecraft configuration can be retained, need for frequent momentum adjust maneuvers and concomitant need to carry large amounts of momentum adjust propellant, can be avoided.

In accord with another aspect of the disclosure, a method of cooling spacecraft borne instrumentation comprises the steps of positioning at least one active cooler at a location spatially separated from the instrumentation, and thermally coupling the cooler to at least one of the spacecraft thermal radiator panels. The method may include sensing temperature of the instrumentation, receiving a prescribed set point temperature, and in response, supplying a control signal to the at least one active cooler. In accord with a specific embodiment, at least one active cooler is within a bank of active coolers, and the coolers are individually controlled. Matrixing of thermal links between active coolers and instrumentation may be implemented.

Additional advantages and aspects of the disclosure will become readily apparent to those skilled in the art from the following detailed description, wherein embodiments of the present disclosure are shown and described, simply by way of illustration of the best mode contemplated for practicing the present disclosure. As will be described, the disclosure is capable of other and different embodiments, and its several details are susceptible of modification in various obvious respects, all without departing from the spirit of the disclosure. Accordingly, the drawings and description are to be regarded as illustrative in nature, and not as limitative.

BRIEF DESCRIPTION OF THE DRAWINGS

The following detailed description of the embodiments of the present disclosure can best be understood when read in conjunction with the following drawings, in which the features are not necessarily drawn to scale but rather are drawn as to best illustrate the pertinent features, wherein.

DETAILED DESCRIPTION

Figure 1B:
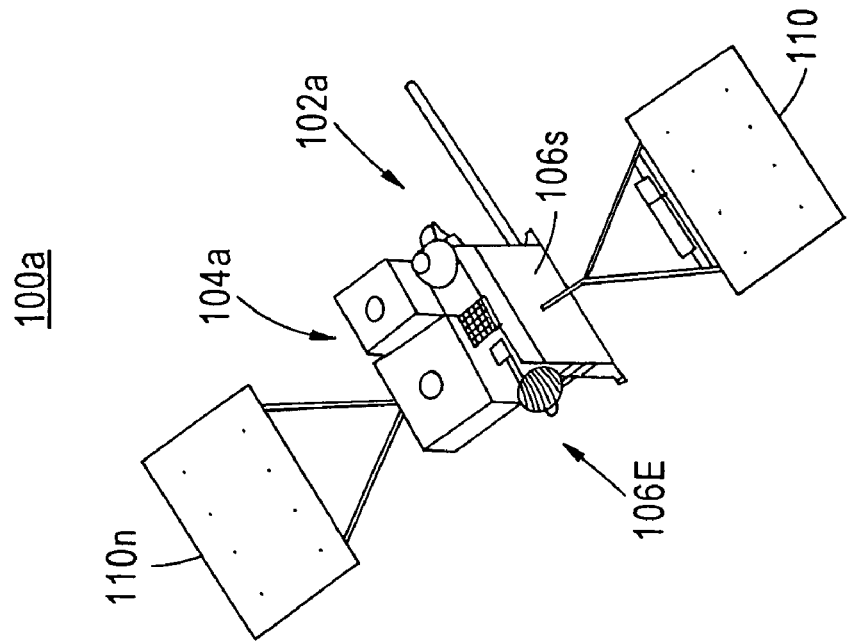
FIGS. 1(a) and 1(b) are views of two exemplary types of satellites with which the described invention may be utilized.
Figure 1A:
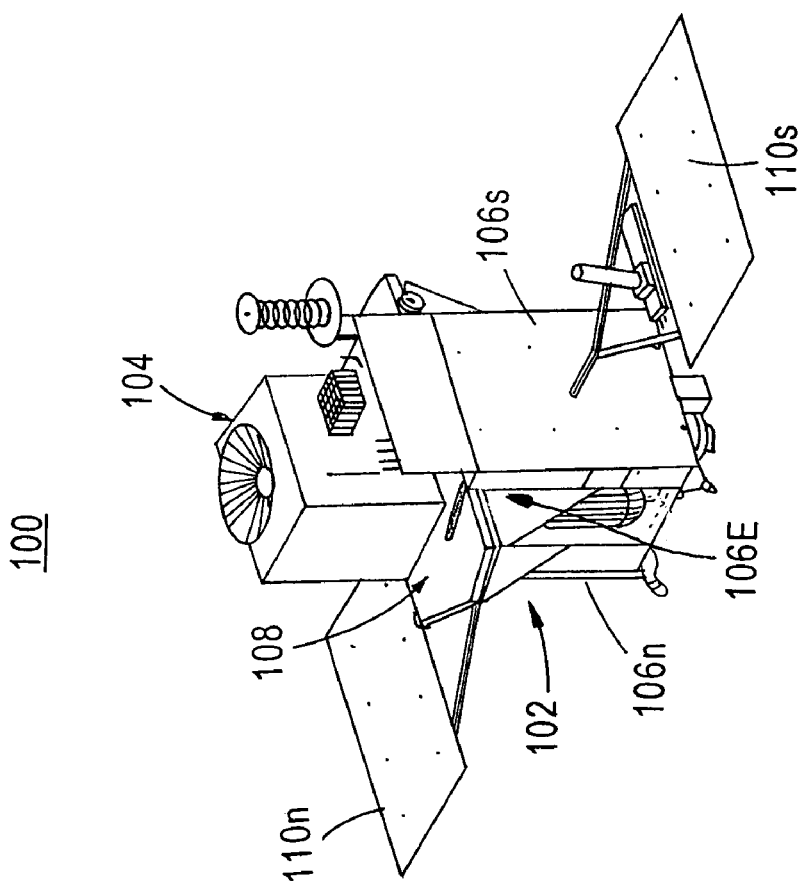

The instrument thermal control system and methodology described herein is applicable generally to any spacecraft, but has particular applicability to geosynchronous remote sensing satellites, such as NASA's GOES-R spacecraft, two examples of which are shown respectively in FIGS. 1(a) and (b). These spacecraft are similar in that they share a common bus 102, 102a, and carry at least one primary instrument, such as an imager or sounder, but support different instrument combinations. For example, spacecraft 100, shown in FIG. 1(a), may include an advanced baseline imager (ABI) 104, and spacecraft 100a may include instruments from an hyperspectral environment suite (HES) 104a.

The instruments include focal planes that must be maintained at cryogenic temperatures during operations. For example, an ABI focal plane may be required to operate at 70 deg. K, and an HES focal plane at 55 deg. K. The bus 102, 102a of each spacecraft supports a number of panels, such as thermal radiator panels 106n, 106s that are north facing and south facing, respectively, as well as an earth-facing panel 106E. Mounted on panel 106E is a dimensionally stable instrument accommodation platform (IAP) 108 on which instruments are mounted (not visible in FIG. 1(b)). The IAP 108 may be attached to the spacecraft earth panel 106E by kinematic mounts that reduce thermal bending stress and jitter transmission from the spacecraft bus 102, 102a to the IAP and instruments. The north and south facing panels 106n, 106s are sized and arranged so as to maximize the radiative emission of thermal energy and minimize absorptance of solar radiation. East and west facing panels are also provided, that support additional instrumentation. Bus and communications equipment and instrument electronics are mounted on these various panels, so that their temperatures may be maintained within acceptable limits. Because the radiator panel sizes are primarily driven by the bus envelope, which in turn is determined by the size of the internal propellant tanks, the thermal capability of the panels generally exceeds required thermal dissipation capability for a GEO remote sensing spacecraft, perhaps by a fifty percent margin. The invention capitalizes on this excess capacity for cooling instrumentation, as will be explained later.

The spacecraft also includes solar arrays 110n, 110s that extend from the north and south panels, each solar array including at least one panel of electric power-producing solar cells. Additional solar cell panels may be added to each solar array, although maintaining the same number of panels on each solar array wing is preferable.

The system described herein functions to transfer heat from the bus-mounted instruments to the thermal radiator panels using active cryogenic coolers, such as cryocoolers, mounted on the bus outside the instrument enclosures. This architecture advantageously implements the excess cooling capacity of the panels, for cooling instrumentation, while spatially separating the cryocoolers from the instrument packaging and mounting platform, so that vibration created by compressors within the cryocoolers is not transferred to the instrumentation.

Figure 2:
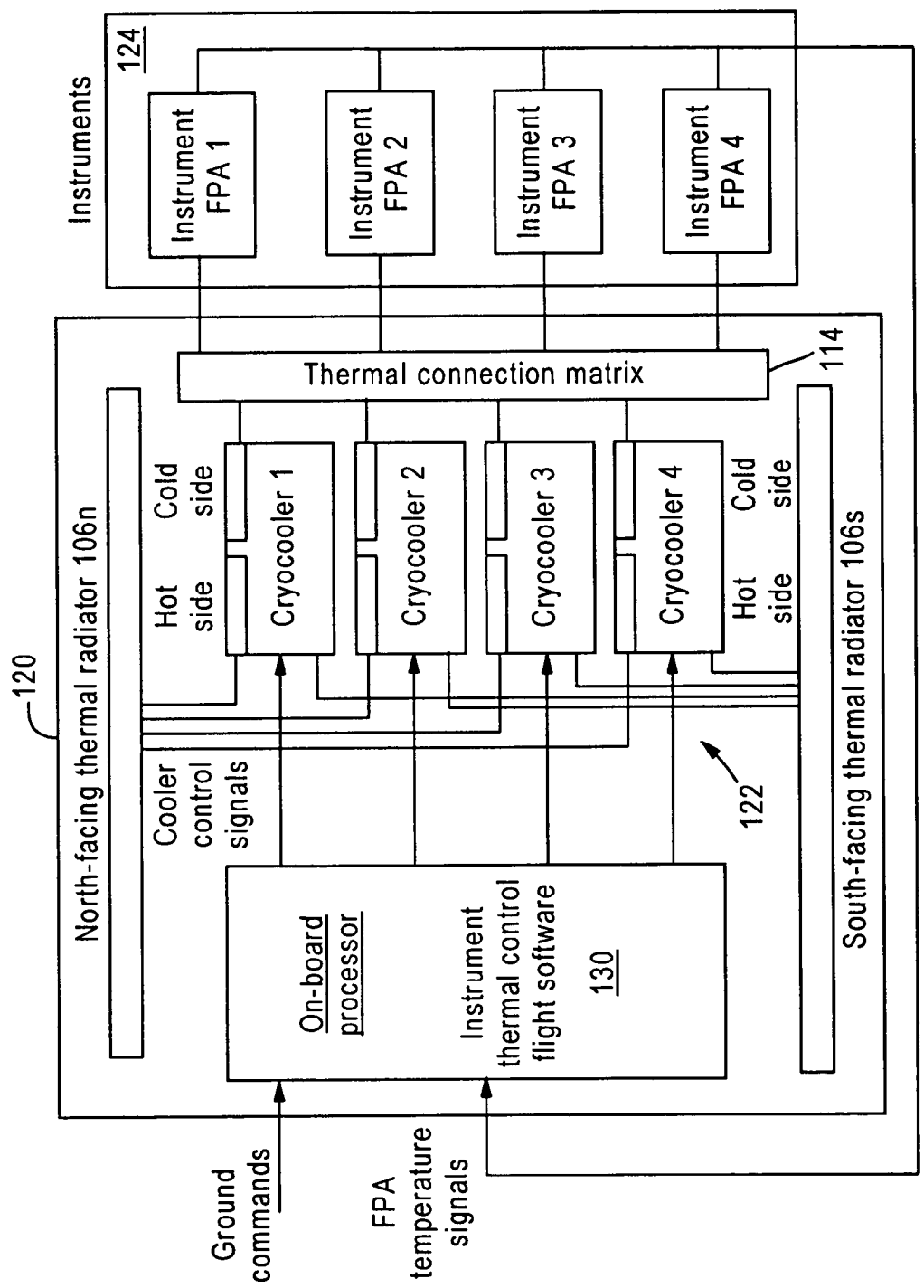
FIG. 2 is a diagram showing an exemplary instrument thermal control architecture in accord with an embodiment of the invention.

More specifically, referring to FIG. 2, on or within the spacecraft bus 102 is provided a thermal control arrangement that establishes a thermal connection between the spacecraft thermal radiators and focal plane assemblies (FPA) of the instruments. This arrangement, or "thermal cryogenic bus (CTB)," 120 in accord with an embodiment of the invention, includes a bank of cryocoolers 122, four of which in the exemplary embodiment being shown, but the number in practice depending on their cooling capacities, FPA temperatures and thermal dissipation, and system reliability requirements (additional units may be provided for redundancy). The cryocoolers may be of single stage or of multiple stage types. The number of FPAs may also vary, and may or may not correspond to the number of cryocoolers in the system.

Each cryocooler 112 is of a conventional and commercially available type, characterized by a compressor and cold head assembly that includes a cold finger that is driven by the compressor to cryogenic cooling temperatures, such as 50 deg. K. The cryocoolers receive electrical power from the spacecraft bus and use mechanical power or other means to remove heat from the FPA. Pulse tube or Stirling cycle cryocoolers may be used that, for example, can provide 1.5 watts of cooling power at 50 to 70 deg. K., while simultaneously providing another 8 watts of cooling power at 130 to 160 deg. K. The cryocoolers may be of a pulse tube configuration, optimized for a specific set of cooling temperatures and loads. One example is a Lockheed Martin GIFTS Cryo Cooler, others are manufactured by Creare, TRW, Ball Aerospace and Matra Marconi Space.

The cryocoolers 122 are controlled by signals produced by a temperature control system (TCS) 130, described in more detail later, to achieve prescribed focal plane set point temperatures of the respective instruments to be cooled. Temperature set points of the system are determined to take into account temperature gradients from sensor elements, radiation shield, or optical bench assemblies through thermal links to the cold fingers of the cryocoolers. Cooling loads are sized based upon not only heat dissipation of sensor elements, but also parasitic heat losses due to the internal assembly conductive and radiative environment and fluctuations in the external environment. In the example of a pulse tube cryocooler configuration, the design may be optimized for a specific set of cooling temperatures and loads. In use, both the cooling temperature and cooling power may be adjusted to achieve desired operating temperatures. In-orbit adjustable active cooling, as may be practiced in accord with an aspect of the invention, achieves enhanced robustness by allowing compensation for parasitic heat looses and greater than expected environmental influences as well as slowing fine tuning of FPA temperatures, to improve data quality.

The cold side of the cryocooler bank 122 is connected to the FPAs of the instruments via a thermal connection matrix (TCM) 114, that represents a general arrangement of thermal connections between the cryocoolers 112 and FPAs 124. In general, for redundancy, more than one cryocooler will be connected to each FPA. All cryocoolers 122 may operate simultaneously, or only a subset may operate at a given time. Where it is needed to simultaneously cool a radiation shield or optical bench, a multiple stage pulse tube cryocooler may be employed. In this example, the cryocooler may have either a multi-stage cold finger assembly or two cold finger assemblies.

Figure 3:
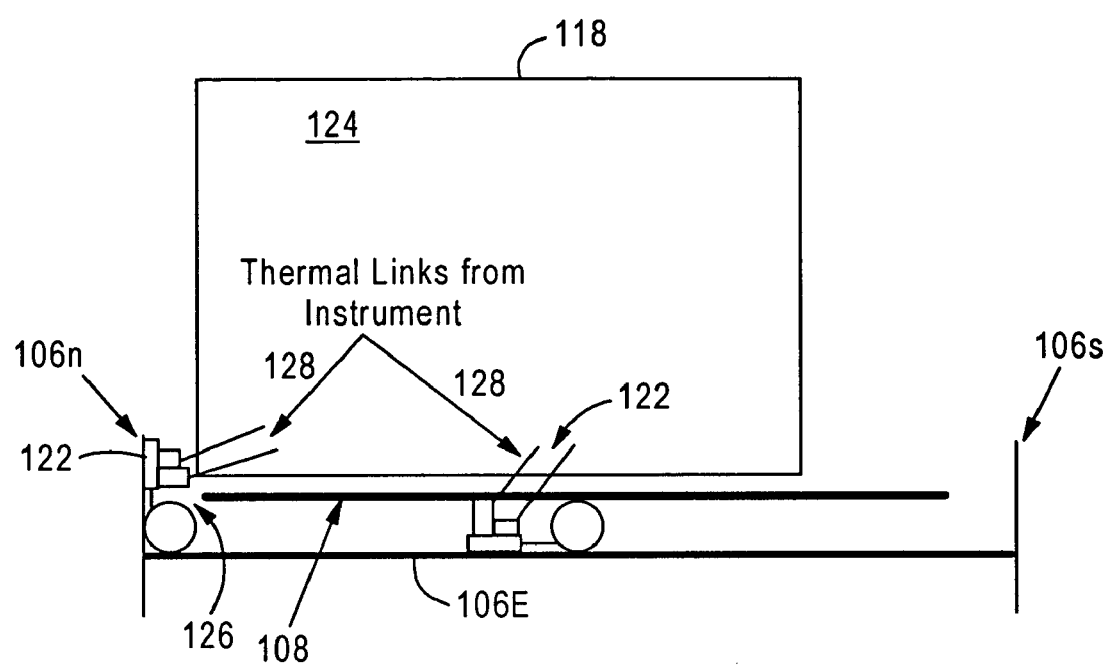
FIG. 3 shows an exemplary thermal interconnection among cryocooler, radiator panel and instrument.

A pulse tube cryocooler has a compressor that is connected to the cold finger assemblies via a working fluid contained within a semi-malleable metal tube, as is conventional. Referring to FIG. 3, the compressor may be mounted to the north panel 106n, to be mechanically isolated from the instruments and their platform. The cold finger assembly working fluid tube passes through a mouse hole 126 in the earth structure deck of the spacecraft between earth panel 106E and platform 108. The cold finger assembly flange is then mounted to a short extension of the north panel above the earth deck on close geometric proximity to the instrument to be cooled, as shown schematically. Thermal links 128 from the instruments thermally couple the FPAs 124 of the instruments to the cold fingers of the cryocoolers, as depicted. The cold finger of the assembly is fastened with a high conductance thermal joint to either the instrument portion to be cooled, or to a thermal link 128 which thermally connects to the target item as depicted. The compressor may be bolted and bonded to the north panel with a standard thermal adhesive, such as CV2646. The cold finger assembly flange also bolts and bonds to the north panel with standard thermal adhesive. The finger fastens to the thermal link or cooled element with a bolted or bolted and bonded interface, as determined by specific load and temperatures desired.

The thermal link 128 may be of rigid high conductivity material, or of a flexible high conductivity material, the latter being preferred in order to provide additional assembly tolerance and compliance with different thermal distortions occurring across the kinematic mount. High conductivity braided copper wire is preferred for this purpose. It is unnecessary for any cryocooler or cold finger elements to intrude into an instrument enclosure or onto a kinematically isolated instrument platform. Only the cold finger interface needs to be coupled to the flexible thermal link. And although the north panel 106n has been described above as the mounting interface for the cryocooler, it may be desirable in some applications to use the underside of the earth facing deck, or the south panel, depending on specific instrument location and spacecraft configuration considerations.

The north and/or south radiator panels 106n, 106s then combine to radiate cryocooler waste heat and extracted FPA and radiation shield thermal energy to deep space. North and south radiator panels may be thermal-mechanically connected together, as depicted in FIG. 3, with thermal-structural nadir (earth) deck or panel 106E containing embedded ambient temperature heat pipes, allowing the cryocooler bank to be located on any of the three (north, south and earth) thermally interconnected panels. During solstice seasons, the sun impinges upon either the north or south panel. This effect is mitigated by the thermal cross-coupling effect of the nadir (earth) panel 106E. Also, since the panels are in an ambient temperature range, having a solar array wing in the radiator field-of-view (FOV) is not a strong consideration as compared to radiators with cryogenic operating temperatures. For example, with the solar array in the radiator FOV, the effective sink temperature of the radiator is roughly 150 deg. K, which would not be acceptable for cryogenic radiator requirements. However, the same radiator would reject over 30 Watts/ft$^2$ when coupled to a cryocooler bank with a hot side temperature of 300 deg. K.

Figure 4:
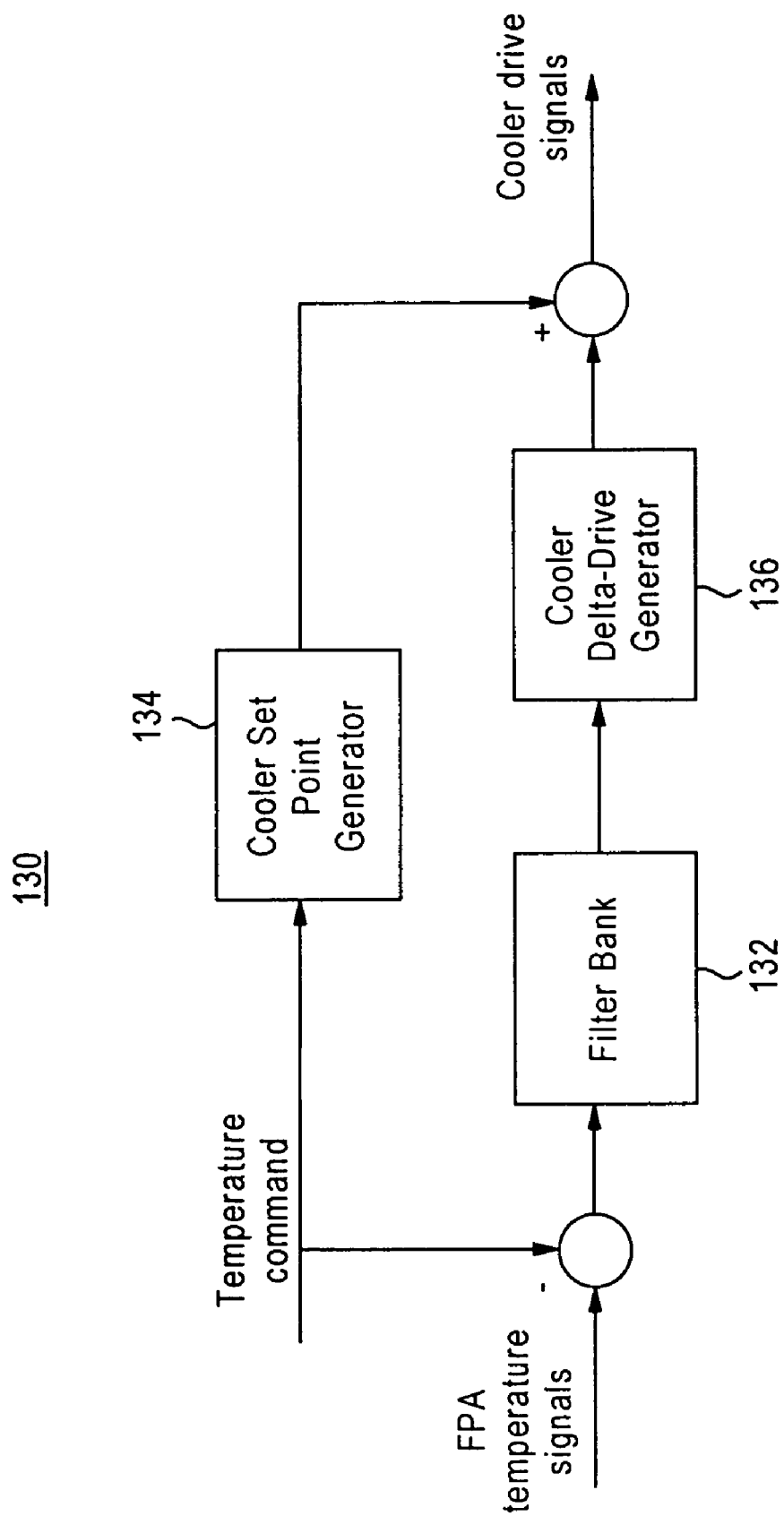
FIG. 4 is a block diagram showing a closed-loop controller, implemented in accord with an embodiment of the invention.

FIG. 4 shows in more detail TCS 130 that operates with the above described thermal control arrangement. TCS 130 receives temperature information from the FPAs via appropriate temperature sensors provided therewith, and continuously or periodically adjusts cryocooler drive signals to maintain correct operating temperatures in the presence of daily and seasonal changes in the instrument thermal environment. Referring to the drawing, a temperature error is computed by subtracting a temperature command, received from ground control or from on-board software, from the FPA measured temperature signals, $T_e = T_{f-Tc}$. The temperature command signal $T_c$ may include a bias component that compensates for any known constant measurement bias errors. The temperature error $T_e$ is then input to a filter bank 132 having N channels, where N is the number of temperature-controlled FPAs. Each channel of the filter bank includes a digital filter that operates to provide high frequency noise attenuation, and whose low-frequency gain and phase characteristics are selected to provide good closed-loop disturbance rejection and transient response characteristics. Those skilled in the art are capable of designing such a filter based on a thermal dynamics model relating changes in the cooler drive signals to changes in FPA temperatures. The filtered error signals are then input to a cooler delta-drive generator, which computes these changes to cooler drive signals Δd for the M cryocoolers using the expression $$\Delta d = -R^T (R R^T)^{-1} T_e \quad (1)$$

where R is an NxM matrix of partial derivatives relating changes in the cooler drive signals to changes in the FPA temperatures $\Delta T_F$.

$$\begin{bmatrix} \Delta T_{F_1} \\ \vdots \\ \Delta T_{F_N} \end{bmatrix} = R \Delta d = \begin{bmatrix} \frac{\partial T_{F_1}}{\partial d_1} & \frac{\partial T_{F_1}}{\partial d_2} & \cdots & \frac{\partial T_{F_1}}{\partial d_M} \\ \vdots & \vdots & & \vdots \\ \frac{\partial T_{F_N}}{\partial d_1} & \frac{\partial T_{F_N}}{\partial d_2} & & \frac{\partial T_{F_N}}{\partial d_M} \end{bmatrix} \begin{bmatrix} \Delta d_1 \\ \Delta d_2 \\ \vdots \\ \Delta d_M \end{bmatrix} \quad (2)$$

Note that the formulation assumes that the number of active coolers is equal to or greater than the number of FPAs. The cooler drive signals D are then compared according to $$D = d_{0 + \Delta d} \quad (3)$$

where $d_0$ is the nominal cooler drive set point, which is computed by the cooler set point generator 134. Generator 134 determines the nominal cooler input drive signals based on a table lookup or model that uses as inputs the commanded FPA temperatures, the FPA thermal dissipation, and the cooler hot sink temperature.

Those skilled in the art will recognize that other embodiments are possible. For example, rather than using the spacecraft north/south panels 106n, 106s to reject instrument heat, it is possible to incorporate east or west facing radiators. Since these are on opposite sides of the spacecraft, one or the other is not solar-illuminated and neither will ever be in the FOV of the solar arrays. Also, rather than connect the hot side of the cryocooler bank to both the north and south radiators, the bank could be connected to one or the other. The spacecraft then will execute a 180-degree yaw flip every 6 months to prevent sun illumination of the radiator. As mentioned previously, the cryocooler bank could also be mounted on the nadir deck, taking advantage of thermal cross-coupling to both the north and south panels, or potentially to east and west radiator panels. Also, rather than incorporating on-board, closed-loop thermal control, as described, it is possible to implement a control algorithm in ground software that determines cooler drive signals based on spacecraft temperature telemetry that are periodically uplinked to the spacecraft. Furthermore, the temperature control point for the cryocooler closed loop control can be chosen at the cold head assembly/cold finger location rather than at the FPA or other remote location in order to minimize any possible detrimental time constraint effects. In this embodiment, a small heater, or several small heaters, may be used at the FPA or other desired locations, along with other closed-loop temperature control, to fine tune the target temperatures.

The foregoing description of the invention illustrates and describes the present invention. Additionally, the disclosure shows and describes only the preferred embodiments of the invention, but as aforementioned, it is to be understood that the invention is capable of use in various other combinations, modifications, and environments and is capable of changes or modifications within the scope of the inventive concept as expressed herein, commensurate with the above teachings, and/or the skill or knowledge of the relevant art. The embodiments described hereinabove are further intended to explain best modes known of practicing the invention and to enable others skilled in the art to utilize the invention in such, or other, embodiments and with the various modifications required by the particular applications or uses of the invention. Accordingly, the description is not intended to limit the invention to the form disclosed herein. Also, it is intended that the appended claims be construed to include alternative embodiments

What is claimed is:

1. A thermal control system for a spacecraft, the spacecraft being characterized in part by a spacecraft bus supporting at least one instrument, and one or more spacecraft thermal radiator panels spatially separated and kinematically isolated from the at least one instrument, the system comprising:

a plurality of active coolers including at least one active cooler, the at least one active cooler mounted or for being mounted to the spacecraft at a location spatially separated and kinematically isolated from the at least one instrument;

a plurality of instruments including the at least one instrument;

at least one kinematic mount for kinematically isolating the at least one active cooler from the at least one instrument; and a closed loop control system;

wherein the closed loop control system is generates cooler drive signals D as follows:

$$T_e = T_f - T_c$$

$$\Delta d = -R^T (R R^T)^{-1} T_e$$

$$D = d_0 + \Delta d$$

where $T_e$ is a temperature error, $T_f$ is a temperature command, $T_c$ is a measured temperature signal, R is an NxM matrix of partial derivatives related to changes in cooler drive signals to changes in temperatures of the plurality of instruments, N is the number of the plurality of instruments, M is the number of the plurality of active coolers, and $d_0$ is a nominal cooler drive set point, the at least one active cooler thermally coupled between the at least one instrument and the one or more spacecraft thermal radiator panels or for thermally coupling the at least one instrument and the one or more spacecraft thermal radiator panels, the at least one active cooler for transferring heat from the at least one instrument to the one or more spacecraft thermal radiator panels.

2. The system as recited in claim 1, in which the at least one active cooler comprises a cryocooler.

3. The system as recited in claim 2, wherein the cryocooler includes a compressor and cold head assembly mounted to a thermal radiator panel of the spacecraft.

4. The system as recited in claim 3, including a thermal link, and in which the cryocooler assembly includes a thermal link coupled to an instrument FPA or other point requiring cryogenic cooling.

5. The system as recited in claim 4, in which the thermal link comprises a flexible high conductivity material.

6. The system as recited in claim 5, in which the thermal link is a high thermal conductivity braided material.

7. The system as recited in claim 4, in which the cryocooler assembly includes a working fluid tube passing through an opening in an earth platform of the spacecraft, for access to the instrument portion to be cooled.

8. The system as recited in claim 4, in which at least one cryocooler is a multiple stage cryocooler, and multiple links emanate from the cryocooler.

9. The system as recited in claim 1, including a thermal link for thermally coupling the at least one active cooler to the at least one instrument, in which the thermal link is braided copper.

10. The system as recited in claim 1, in which the at least one active cooler is one among a bank of multiple active coolers.

11. The system as recited in claim 1, including a closed loop control system configured to measure temperature of the at least one instrument, receive a prescribed set temperature, and in response supply a control signal to the at least one active cooler.

12. The system as recited in claim 1, in which the at least one active cooler is thermally coupled to any one or more of a north, south, east, west or earth panel of the spacecraft.

13. The system as recited in claim 1, in which the spacecraft includes two solar array wings extending therefrom.

14. The system as recited in claim 1, wherein the at least one active cooler is a vibrating active cooler, and wherein the at least one instrument is a heat-generating instrument.

15. A system comprising:
an instrument platform;
a plurality of instruments including at least one instrument mounted on the instrument platform;
at least one thermal radiator mounted at a location spatially separated and kinematically isolated from the at least one instrument;
a plurality of active coolers including at least one active cooler mounted at a location spatially separated and kinematically isolated from the at least one instrument;
a thermal link thermally coupled between the at least one active cooler and the at least one instrument;
at least one kinematic mount for kinematically isolating the at least one active cooler from the at least one instrument; and
a closed loop control system,
wherein the closed loop control system is generates cooler drive signals D as follows:

$T_e = T_f - T_c$ $\Delta d = -R^T(R\ R^T)^{-1} T_e$ $D = d_0 + \Delta d$ where $T_e$ is a temperature error, $T_f$ is a temperature command, $T_c$ is a measured temperature signal, R is an NxM matrix of partial derivatives related to changes in cooler drive signals to changes in temperatures of the plurality of instruments, N is the number of the plurality of instruments, M is the number of the plurality of active coolers, and $d_0$ is a nominal cooler drive set point, and wherein the at least one active cooler is for transferring heat from the at least one instrument to the at least one thermal radiator.

16. The system as recited in claim 15, wherein the thermal link is braided copper.

17. The system as recited in claim 16, further comprising:
a second active cooler,
a second thermal link coupled between the second active cooler and the at least one instrument,
wherein the second thermal link is braided copper.

18. The system as recited in claim 15, wherein the system is a spacecraft, the system further comprising:
two solar array wings;
a first spacecraft panel;
a second spacecraft panel;
a second thermal radiator;
a second active cooler mounted on the second spacecraft panel,
wherein the second spacecraft panel is the second thermal radiator,
wherein the first spacecraft panel is the at least one thermal radiator,
wherein the at least one active cooler is mounted on the first spacecraft panel,
wherein having the at least one active cooler and the second active cooler mounted on the first and second spacecraft panels, respectively, eliminates a need to perform a yaw flip of the spacecraft required to prevent radiator sun exposure,
wherein the two solar array wings minimize a solar pressure torque, minimize a need for frequent momentum-adjust maneuvers, and minimize a need to carry a large amount of momentum-adjust propellant.

19. The system as recited in claim 15, wherein the at least one active cooler is a vibrating active cooler, and wherein the at least one instrument is a heat-generating instrument.

20. A thermal control system for a spacecraft, the system comprising:
a closed loop control system;
a plurality of active coolers; and
a plurality of instruments,
wherein the closed loop control system is generates cooler drive signals D as follows:

$T_e = T_f - T_c$ $\Delta d = -R^T(R\ R^T)^{-1} T_e$ $D = d_0 + \Delta d$ where $T_e$ is a temperature error, $T_f$ is a temperature command, $T_c$ is a measured temperature signal, R is an NxM matrix of partial derivatives related to changes in cooler drive signals to changes in temperatures of the plurality of instruments, N is the number of the plurality of instruments, M is the number of the plurality of active coolers, and $d_0$ is a nominal cooler drive set point.

21. The system as recited in claim 20, wherein the plurality of instruments includes at least one instrument,
wherein the plurality of active coolers includes at least one active cooler mounted to the spacecraft at a location spatially separated from the at least one instrument.

* * * * *

UNITED STATES PATENT AND TRADEMARK OFFICE
CERTIFICATE OF CORRECTION

| | | |
|---|---|---|
| PATENT NO. | : 7,270,302 B1 | Page 1 of 1 |
| APPLICATION NO. | : 10/829358 | |
| DATED | : September 18, 2007 | |
| INVENTOR(S) | : Hamilton Wong et al. | |

It is certified that error appears in the above-identified patent and that said Letters Patent is hereby corrected as shown below:

In column 7, line 38, "$D=D_{o+\Delta d}$" should read -- $D=D_o+\Delta d$ --.

In claim 1, column 8, line 44, "a system is generates" should read -- system generates --.

In claim 15, column 9, line 57, "system is generates" should read -- system generates --.

In claim 15, column 9, line 64, "$D=D_{o+\Delta d}$" should read -- $D=D_o+\Delta d$ --.

In claim 20, column 10, line 45, "system is generates" should read -- system generates --.

Signed and Sealed this

Fifth Day of August, 2008

JON W. DUDAS
*Director of the United States Patent and Trademark Office*